United States Patent [19]

Fukunaga

[11] 4,351,203
[45] Sep. 28, 1982

[54] GEAR BOX BREATHER PLUG ASSEMBLY

[75] Inventor: Koichi Fukunaga, Toyota, Japan

[73] Assignee: Toyota Jodosha Kogyo Kabushiki Kaisha, Toyota, Japan

[21] Appl. No.: 180,418

[22] Filed: Aug. 22, 1980

[30] Foreign Application Priority Data

Aug. 30, 1979 [JP] Japan .................... 54-118450[U]

[51] Int. Cl.³ .................... F16H 57/02; F16K 15/00
[52] U.S. Cl. .................... 74/606 R; 55/417; 74/607; 137/540
[58] Field of Search ............... 74/606 R, 607; 55/417; 137/171, 540

[56] References Cited

U.S. PATENT DOCUMENTS

| 3,186,374 | 6/1965 | Heidner | 74/606 R X |
| 3,228,419 | 1/1966 | Smith et al. | 137/540 |
| 3,314,306 | 4/1967 | Barclae | 74/606 R |
| 3,916,724 | 11/1975 | Muller et al. | 74/606 R |

FOREIGN PATENT DOCUMENTS 136064  6/1979  Fed. Rep. of Germany .... 74/606 R

Primary Examiner—Allan D. Herrmann
Attorney, Agent, or Firm—Kenyon & Kenyon

[57] ABSTRACT

A breather plug assembly for a gear box utilized in an automobile or other machine. The breather plug has a deflector member of tubular shape, having a cylindrical portion contacting the flow of lubricant formed along the inner surface of the gear box. The cylindrical portion is provided with at least one hole located downstream of the flow. Said hole allows ventilation of the interior of the box to the atmosphere.

4 Claims, 9 Drawing Figures

GEAR BOX BREATHER PLUG ASSEMBLY

FIELD OF THE INVENTION

The present invention relates to a breather plug assembly adapted to be connected to a gear box in order to maintain a pressure in the gear box which is lower than a predetermined constant value.

BACKGROUND OF THE INVENTION

In a gear box for an automobile or other machine, a breather plug in connected to a housing of the gear box. The plug is provided with a deflector of tubular shape which is connected to the housing and extend to a space in the housing. When the pressure in the housing is increased due to a heat expansion of lubricant oil stored in the housing, a valve mechanism incorporated in the plug is opened for venting the space in the housing to the atmosphere, in order to prevent the pressure in the housing from being highly increased. However, in breather plugs of the prior art, wherein the deflector is contacted with the flow of lubricant formed along the inner surface of the gear box, a ventilation operation cannot be fully effected due to an air space formed downstream of the deflector. As a result of this, a pressure in the housing is easily increased, and there is a large possibility of lubricant leakage.

SUMMARY OF THE INVENTION

An object of the present invention is to provide a breather plug assembly, capable of preventing any occurrence of oil leakage.

According to the present invention, a breather plug assembly for a gear box is provided, which gear box has a housing in which a lubricant oil is stored, and a gear assembly arranged in the housing, and a flow of fuel is formed along the inner surface of the housing when the gear assembly is operated. The breather plug assembly comprises: a deflector member having a first open end fixedly connected to the housing, a second open end located in the interior of the housing, and a cylindrical portion located between the ends, the flow of lubricant transversly contacting with the cylindrical surface of the cylindrical portion; and valve means connected to said end of said deflector member, responsive to the pressure in the housing, for providing a fluid connection between the interior of the housing and the atmosphere. The cylindrical surface of the deflector member is provided with at least one hole which is located downstream of the flow of the lubricant along the inner surface of the housing.

BRIEF DESCRIPTION OF THE ATTACHED DRAWING

DETAILED DESCRIPTION OF PREFERRED EMBODIMENTS

Figure 1:
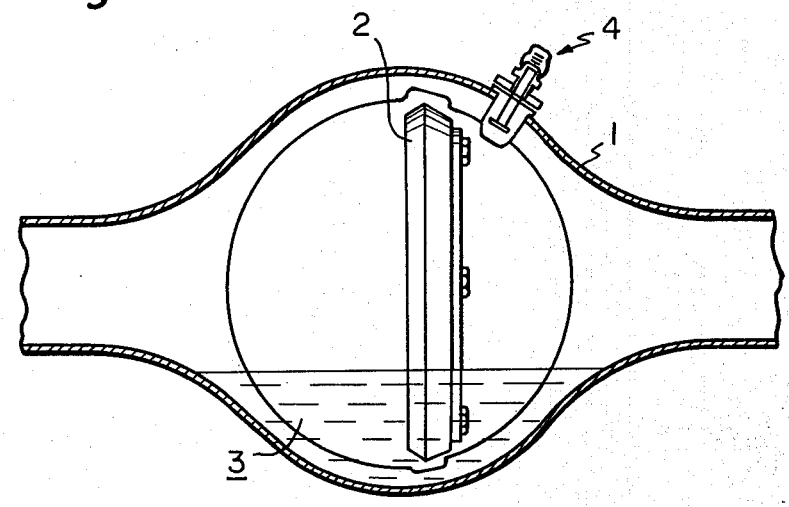
FIG. 1 is a cross sectional view of a gear box.

Referring to FIG. 1, reference numeral 1 designates a rear axle housing for an automobile. In the axle housing, a gear assembly 2 is arranged so that a lower portion of the gear assembly is contacted with a lubricant oil 3 stored in the bottom of the interior of the housing 1. A breather plug assembly 4 is connected to the housing at an upper portion thereof adjacent to the upper portion of the gear assembly.

Figure 2:
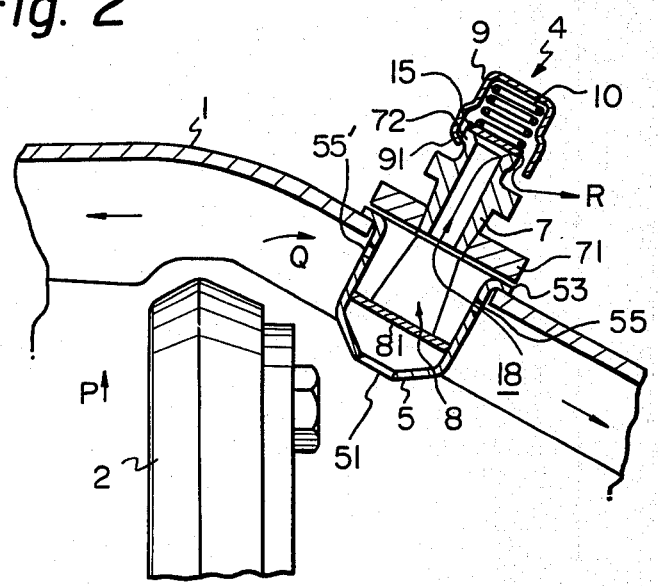
FIG. 2 is an enlarged view of a breather plug illustrated in FIG. 1.
Figures 3A, 3B, 3C:
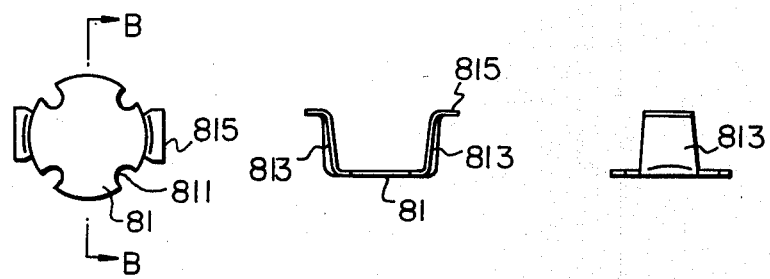
FIG. 3A, illustrates an upper elevational view of a shield plate.
FIG. 3B illustrates a cross sectional view along B—B line in FIG. 3A.
FIG. 3C is a side elevational view of the shield plate.
Figures 4A, 4B, 4C:
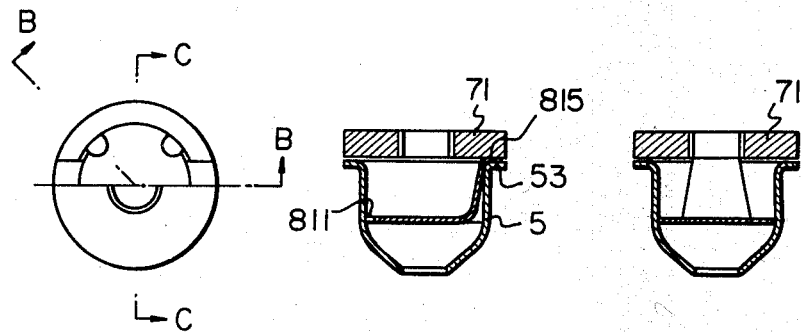
FIG. 4A is an upper view of a plug to which the shield plate and the deflector are connected.
FIG. 4B is a cross sectional view along the B—B line in FIG. 4A.
FIG. 4C is a cross sectional view along C—C line in FIG. 4A.

As illustrated in FIG. 2, the breather plug assembly 4 essentially includes a deflector 5 of tubular shape, a plug seat 7 having a flanged tube shape located above the deflector 5, a shield plate 8 arranged inside the deflector 5, a cap 9 connected to the seat 7 and a spring 10 arranged in the cap 9. The deflector 5 has, at its lower end, an opening 51 opened to the interior of the rear axle housing 1 (FIG. 1). At its upper end, the deflector 5 has a flange portion 53. The shield plate 8, as illustrated in FIGS. 3A, 3B and 3C, is comprised of a bottom plate portion 81 having circumferentially spaced recesses 811, a pair of side wall portions 813 and a pair of upper flange portions 815. The bottom plate portion 81 at its outer periphery contacts the inner surface of the deflector 5, as illustrated in FIGS. 4B and 4C, so that a flow of fluid can pass through passageways formed between the recesses 811 and the inner surface of the deflector 5. The upper flange portions 815 are, together with a flange portion 71 of the seat 7 and with a flange portion 53 of the deflector 5, fixedly connected to the housing 1 by welding. At its lower end, the cap 9 is provided with angularly spaced inwardly bent portions 91. The portions 91 are engaged with an annular projection 72 located at an upper end of the seat 7, whereby the cap 9 is press-fitted to the seat 7 while air can be passed between the cap 9 and the seat 7. The spring 10 is arranged between the cap 9 and a valve plate 15, so that the inwardly bent portions 91 are positively engaged with the annular projection 72 and the valve 15 is seated on the seat 72. When the pressure in the device is increased, the member 15 is detached from the seat 7, so that a pressure in the device is exhausted as described below.

According to the present invention, the deflector 5 is, at its tubular wall portion located downstream of the flow of lubricant 3 generated in the housing 1 as shown by arrows Q, provided with at least one opening 55 which is opened to the interior of the housing 1 at a position adjacent to the inner surface of the housing 1. It should be noted that four equiangulary spaced openings are formed in the tubular wall of the deflector 5, and therefore one of these holes is always located on the downstream side, in spite of an angular position of the deflector 5 with respect to the housing 1.

When the gear assembly 2 is rotated, the lubricant 3 in the housing 1 is moved upwardly, as illustrated by an arrow P, by centrifugal force. The flow of the lubricant 3 is then contacted with the inner surface of the housing 1. Therefore, a flow of the lubricant 3 along the inner surface of the housing 1 as illustrated by the arrow Q which is directed to the deflector 5 is generated. Since the lubricant 3 has a high viscosity value, the flow of the lubricant 3 does not extend to a side of a tubular portion located downstream of the flow of the lubricant 3. Therefore, an air region 18 is formed on the downstream side of the deflector 5 adjacent to the outer surface of the deflector. Since the opening 55 is located on the downstream side of the deflector 5, the air in the air region 18 is exhausted to the outside of the housing 1, as illustrated by an arrow R (FIG. 2), via the opening 55, an inner bore of the seat 7, a slit formed between the valve plate 15 and the upper end 72 of the seat 7 and slits formed between the cap 9 and the seat 7. Due to this ventilation effect a pressure difference between the inside and outside of the housing 1 is maintained at a constant, small value. Therefore, an amount of the lubricant 3 introduced into the interior of the deflector 5 via the opening 51 is maintained in the deflector 5 without being exhausted out of the cap 9.

It should be noted that the bottom plate portion 81 of the shield plate 8 controls the amount of lubricant oil 3 to be introduced into the device. A leakage of lubricant oil 3 via the opening 55' located on the upstream side of the deflector 5 does not occur easily, due to the fact that the diameter of the opening is small, the lubricant 3 has a large viscosity, and the pressure difference is small. Even if a small amount of the lubricant 3 leaks into the space, the lubricant 3 is prevented from being exhausted from the device due to the ventilation effect as has been already described.

According to the present invention as described above, oil leakage can be effectively prevented, so that the gear assembly 2 in the housing 1 is sufficiently lubricated to prevent wear or damage. It should be noted that the device of the invention can be manufactured by only a small increase of cost over a design of the prior art.

Figure 5:
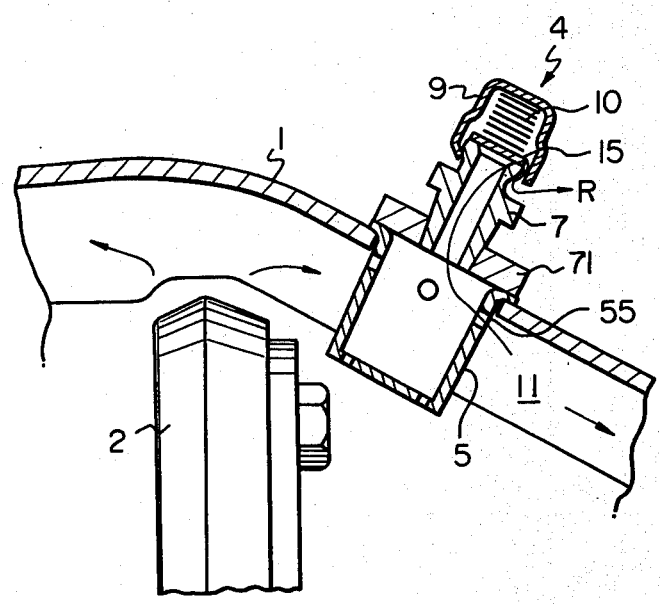
FIG. 5 shows another embodiment of the present invention.

FIG. 5 shows a modification of the present invention wherein a shield plate 8 in FIG. 2 is omitted. The deflector 5 is formed as a cap member, which has holes at a bottom end thereof. At least one hole 55 is formed in the cylindrical surface which is located on the downstream side of the deflector 5.

I claim:

1. A breather plug assembly for a gear box having a housing and a gear assembly, arranged in the housing, a lubricant oil being stored in the housing, a flow of lubricant being formed in the housing along the inner surface of the housing when the gear assembly is operated, said breather plug assembly comprising: a deflector member having a first open end fixedly connected to the housing a second open end located in the interior of the housing; and a cylindrical portion located between said two ends, the flow of lubricant transversly contacting with the cylindrical surface of said cylindrical portion; and valve means connected to said first end of said deflector member for providing, in response to the pressure in said housing, a fluid connection between the interior of said housing and the atmosphere, said deflector member being, at the cylindrical surface, provided with at least one hole which is located downstream of the flow of the lubricant along the inner surface of the housing.

2. A breather plug assembly according to claim 1, wherein equiangulary spaced holes are formed in the cylindrical surface of the deflector member.

3. A breather plug assembly according to claim 1, wherein said deflector member has a tubular shape, and said plug, further includes a shield plate arranged in said deflector member.

4. A breather plug assembly according to claim 1, wherein said member has a cap shape having holes at a bottom end thereof.

* * * * *